(12) United States Patent
Hagenbuch

(10) Patent No.: US 7,446,652 B2
(45) Date of Patent: *Nov. 4, 2008

(54) SEATBELT USAGE DETECTION SYSTEM

(76) Inventor: LeRoy G. Hagenbuch, 502 W. Northgate Rd., Peoria, IL (US) 61614

( * ) Notice: Subject to any disclaimer, the term of this patent is extended or adjusted under 35 U.S.C. 154(b) by 110 days.

This patent is subject to a terminal disclaimer.

(21) Appl. No.: 11/324,613

(22) Filed: Jan. 3, 2006

(65) Prior Publication Data

US 2006/0125614 A1 Jun. 15, 2006

Related U.S. Application Data

(63) Continuation of application No. 10/282,514, filed on Oct. 29, 2002, now Pat. No. 7,005,976.

(60) Provisional application No. 60/340,037, filed on Oct. 30, 2001.

(51) Int. Cl.
*B60Q 1/00* (2006.01)

(52) U.S. Cl. .............. 340/457.1; 340/457; 340/426.31; 180/286; 180/268

(58) Field of Classification Search .............. 340/457.1, 340/457, 426.21; 180/268, 286
See application file for complete search history.

(56) References Cited

U.S. PATENT DOCUMENTS

| 3,732,538 | A | | 5/1973 | Gillund et al. | |
|---|---|---|---|---|---|
| 3,748,639 | A | * | 7/1973 | Dobedoe et al. | 340/457.1 |
| 3,806,867 | A | * | 4/1974 | Quantz | 340/457.1 |
| 3,860,904 | A | | 1/1975 | Andersen | |
| 3,864,668 | A | | 2/1975 | Bickford | |
| 4,015,236 | A | * | 3/1977 | Boudeville | 340/457.1 |
| 4,107,645 | A | * | 8/1978 | Lewis et al. | 340/667 |
| 4,885,566 | A | | 12/1989 | Aoki et al. | |
| 5,483,221 | A | * | 1/1996 | Mutter et al. | 340/457.1 |
| 5,877,707 | A | * | 3/1999 | Kowalick | 340/988 |
| 6,184,785 | B1 | * | 2/2001 | Midorikawa | 340/457.1 |

(Continued)

OTHER PUBLICATIONS

"Seat Belts for Construction Machines", SAE J386, Apr. 1980.

(Continued)

*Primary Examiner*—George A Bugg
*Assistant Examiner*—Eric M Blount
(74) *Attorney, Agent, or Firm*—Leydig, Voit & Mayer, Ltd.

(57) ABSTRACT

A system for detecting proper usage of a seatbelt in a vehicle by an operator of the vehicle is provided. The seatbelt usage detection system includes a first communication device arranged on the seatbelt and a second communication device. One of the first and second communication devices is a transmitter and the other of the first and second communication devices is a receiver. The receiver and transmitter are capable of establishing a communication link with each other. The second communication device is arranged in the vehicle so as to be able to establish a communication link with the first communication device of a predetermined signal strength upon proper fastening of the seatbelt around the body of an operator. The system also includes a processing unit for monitoring the signal strength of the communication link between the first and second communication devices and for providing a signal that the seatbelt is unfastened when the signal strength is less than the predetermined signal strength.

23 Claims, 1 Drawing Sheet

U.S. PATENT DOCUMENTS

| | | | |
|---|---|---|---|
| 6,203,059 B1 | 3/2001 | Mazur et al. | |
| 6,215,395 B1* | 4/2001 | Slaughter et al. | 340/457.1 |
| 6,362,734 B1* | 3/2002 | McQuade et al. | 340/457.1 |
| 6,501,374 B1* | 12/2002 | King et al. | 340/457.1 |
| 6,533,057 B1* | 3/2003 | Houten et al. | 180/269 |
| 6,806,810 B2* | 10/2004 | Robinson | 340/457.1 |
| 6,860,355 B2* | 3/2005 | Houten et al. | 340/457.1 |
| 7,005,976 B2* | 2/2006 | Hagenbuch | 340/457.1 |
| 7,061,375 B2* | 6/2006 | Koike et al. | 340/457.1 |

OTHER PUBLICATIONS

"USA Human Physical Dimensions", SAE J833, Jan. 1980.

"Operator's Seat Dimensions of Off-Road Self-Propelled Work Machines", SAE J899, Oct. 1980.

"Control Locations for Construction and Industrial Equipment Design", SAE J898, Apr. 1980.

Sherman, Don, "Its In", *Popular Science Advanced Safety Engineering Auto Tech '93*, pp. 58-63, Oct. 1992.

"Seat Belt Comfort, Fit and Convenience", SAE J1834, Jun. 1991.

"The Air Bag Systems in Your Car 'What the Public Needs to Know'", SAE J2074, Jun. 1993.

"Guidelines for Evaluating Child Restraint System Interactions with Deploy Airbag", SAE J2189, Mar. 1993.

"The Effects of Front-Mounted Accessories on Air Bag Sensors and Crashworthiness", SAE J2431, Oct. 1997.

* cited by examiner

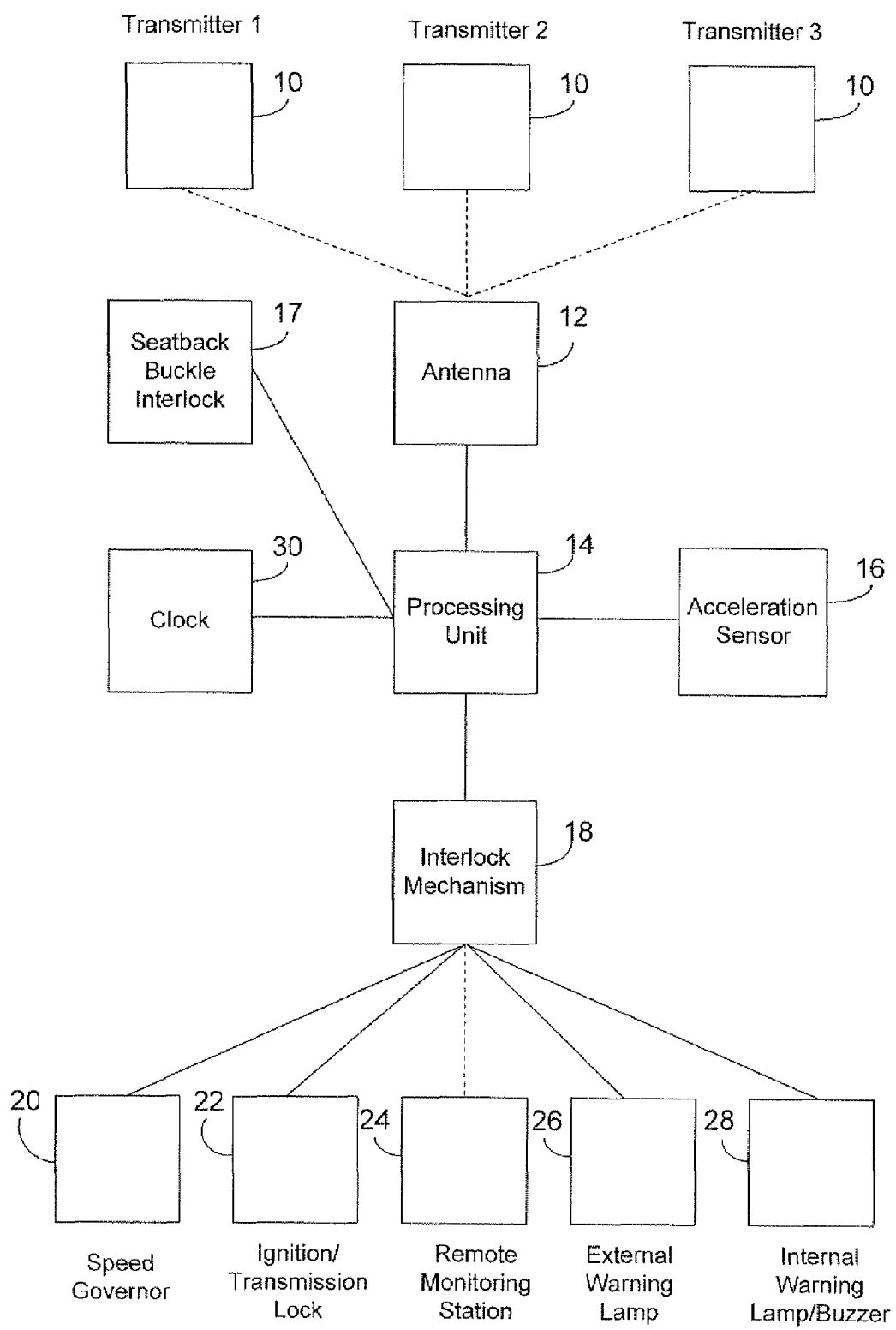

SEATBELT USAGE DETECTION SYSTEM

CROSS-REFERENCE TO RELATED PATENT APPLICATIONS

This patent application is a continuation of U.S. patent application Ser. No. 10/282,514 filed on Oct. 29, 2002 now U.S. Pat. No. 7,005,976, which claims the benefit of U.S. Provisional Patent Application No. 60/340,037 filed Oct. 30, 2001.

FIELD OF THE INVENTION

This invention relates generally to a seatbelt assembly and, more particularly, to a detection system for confirming that a driver properly fastens and uses the seatbelt.

BACKGROUND OF THE INVENTION

Seatbelts have been widely used in the United States since the 1960's. Their usefulness in protecting lives has been demonstrated many times over. However, many individuals still refuse to use seatbelts, leading to many injuries and fatalities that could otherwise be avoided. This failure to use seatbelts is exacerbated in the operation of industrial equipment such as vehicles used in commercial enterprises, factories, construction sites and mines. As will be appreciated, accidents involving such vehicles are potentially more dangerous then those involving passenger vehicles.

To help avoid potentially serious injuries as well as stiff penalties for violations of workplace safety regulations, e.g., Mine Safety and Health Administration (MSHA); Occupational Safety and Health Administration (OSHA); etc., employers often take actions to ensure that their employees utilize seatbelts while operating motorized vehicles. Several methods for ensuring that seatbelts are correctly used have been tried or proposed. These include fining employees who are discovered operating a vehicle while not using a seatbelt and utilizing various devices that prevent a vehicle from starting or moving unless the seatbelt is latched. However, imposing fines still requires some method of determining whether an operator has properly fastened the vehicle's seatbelt. Furthermore, an operator can easily defeat the seatbelt interlocks by pulling out the seatbelt, fastening it, and sitting upon it. Therefore, a need exists for a system which determines not just whether a vehicle's seatbelt is buckled, but that the seatbelt is fastened in the correct and intended manner.

BRIEF SUMMARY OF THE INVENTION

The present invention provides a system for detecting proper usage of a seatbelt in a vehicle by an operator of the vehicle. The seatbelt usage detection system includes a first communication device arranged on the seatbelt and a second communication device. One of the first and second communication devices is a transmitter and the other of the first and second communication devices is a receiver. The receiver and transmitter are capable of establishing a communication link with each other. The second communication device is arranged in the vehicle so as to be able to establish a communication link with the first communication device of a predetermined signal strength upon proper fastening of the seatbelt around the body of an operator. The system also includes a processing unit for monitoring the signal strength of the communication link between the first and second communication devices and for providing a signal that the seatbelt is unfastened when the signal strength is less than the predetermined signal strength.

BRIEF DESCRIPTION OF THE DRAWINGS

FIG. 1 is a schematic diagram of an exemplary seatbelt detection system in accordance with the present invention.

DETAILED DESCRIPTION OF THE INVENTION

The present invention comprises a highly reliable and accurate system for confirming that the seatbelt of a vehicle is correctly fastened around the operator. To this end, the system includes a mechanism that detects the position of the seatbelt relative to both the vehicle steering mechanism and the vehicle operator and confirms that the seatbelt's position appropriately secures the operator as intended. The monitoring of the seatbelt position and confirmation that the seatbelt is properly fastened is performed not only when the vehicle is first started up, but also on a periodic or continuous basis thereafter to ensure that the operator does not subsequently remove the seatbelt. Moreover, since the present invention monitors the actual position of the seatbelt relative to both the operator and the steering wheel or steering mechanism of the vehicle as opposed to simply monitoring whether the seatbelt is latched, an operator cannot defeat the system by sitting on top of a latched seatbelt. As described in greater detail below, confirmation of proper use of the seatbelt can include additional features, which can make the system virtually impossible to defeat. Optionally, the system of the present invention can also include one or more interlock mechanisms that carry out appropriate actions when the seatbelt is not properly fastened in use around the operator thus encouraging the operator to correctly fasten and use the seatbelt. Thus, the present invention provides a seatbelt usage detection system which can virtually guarantee that a vehicle operator has properly fastened and is using the seatbelt around his body.

In the embodiment illustrated in FIG. 1, the system includes communication devices that are arranged such that they are capable of communicating through a wireless connection or link (e.g., via an IR or RF electromagnetic link) or a connection of a given electromagnetic signal strength only when the seatbelt is correctly fastened and in use around the operator. In the illustrated embodiment, the communication between the devices is via a wireless electromagnetic link in which the devices can comprise a signaling device such as a transmitter 10 or transceiver, which can be wireless, and a receiving device such as an antenna 12 or transceiver. For example, one electromagnetic communication device can be affixed to the seatbelt and the other electromagnetic communication device can be located in a position substantially in front of the operator such as on or embedded in the steering wheel, steering mechanism or steering column. The electromagnetic communication devices can be selected such that they have a limited communication range (e.g., approximately 3-15 inches, plus or minus) such that for a transmission by the signaling device 10 to be successfully received by the receiving device 12, the seatbelt and its corresponding electromagnetic communication device must be positioned in front of the operator as consistent with the seatbelt's appropriate use. If the seatbelt is positioned behind the operator, as would occur if the seatbelt is unfastened or if the operator sits upon a fastened belt, the communication between the electromagnetic receiving and signaling devices 12, 10 would be either outside the communication range of the devices or substantially blocked by the body of the operator. Thus, by monitoring via a processing unit 14 such as an integrated circuit or other similar device whether the receiving device 12 is receiving the signal from the signaling device 10 or the strength of the signal received, the detection system can detect whether the operator has correctly fastened and is using the seatbelt. Of course, it will be appreciated that all that is necessary are devices which are capable of establishing a wireless communication link and as such signaling devices other than transmitters and receiving devices other than antennas can be used.

In order to help prevent subversion of the system, the system can be configured with a plurality of electromagnetic communication devices such as transmitters 10 (e.g., three in the illustrated embodiment) on or encapsulated in the steering wheel or steering mechanism and a electromagnetic communication device such as the antenna 12 can be affixed to the seatbelt by interweaving an antenna wire into the seatbelt fabric. In this embodiment, the transmitters 10 are arranged around the circumference of the steering wheel such that when the steering wheel is in various rotary positions only one of the transmitters 10 is typically within range of the antenna 12 in the seatbelt. Rotating the steering wheel therefore causes different transmitters 10 to interact with the antenna 12. By configuring the transmitters 10 so that they each emit a distinct signal, the processing unit 14 of the detection system can determine the direction of rotation of the steering wheel by comparing the sequence of signals received by the antenna 12 with the known signal sequences indicating left or right turns of the steering wheel. In this embodiment, a second mechanism for detecting turning of the vehicle such as an acceleration sensor 16 (e.g., an accelerometer) can be tied into the seatbelt detection system. In particular, the acceleration sensor 16 detects the left or right acceleration typically associated with turning of the vehicle. Each time the acceleration sensor 16 detects a left or right turn of the vehicle, the processing unit 14 can confirm whether the sequence of signals received by the antenna 12 also indicates a rotation of the steering wheel to either the right or left. If a confirmation of the correct left or right turn is not provided by the signals received by the antenna 12, the processing unit 14 can provide an indication or a signal that the detection system is not operating correctly or has been tampered with.

Thus, using this particular configuration for the seatbelt usage detection system can help prevent the operator of the vehicle from defeating the system by attaching decoy transmitters (e.g., transmitters 10) to the seatbelt since such an arrangement would provide a continuous reading of the decoy transmitter that would not change upon turning of the vehicle. Additionally, this configuration would prevent an operator from simply arranging the seatbelt along side the steering wheel so that the antenna 12 is within the range of the transmitters 10 without the seatbelt actually being fastened since proper clocking of the transmitters on the steering wheel would mean that in a straight ahead vehicle operation condition the wrong transmitter would be continuously read and depending on how the seatbelt was positioned the proper sequence of transmitter readings would not be provided upon turning the vehicle.

Alternatively, the acceleration sensor can be eliminated and the processing unit 14 can be adapted to compare the rotation of the steering wheel measured by interaction between the antenna 12 and transmitters 10 with a predetermined estimate of steering wheel rotation of a like vehicle under similar circumstances. Where readings from the antenna and transmitters indicate that the operator has not rotated the steering wheel for an unusually long period of time, the system can provide a default or tamper signal.

With embodiments of the invention employing the antenna 12 in the seatbelt and one or more transmitters 10 in the steering wheel, the connection between the antenna 12 and processing unit 14 can occur across the seatbelt's latch and buckle, which thus acts as a switch within the antenna—processing unit circuit. Alternatively, if the antenna circuit is not made through the seatbelt buckle, the system can include a separate seatbelt buckle interlock 17 which provides a signal when the seatbelt is not buckled. This configuration helps prevent tampering by use of decoy-transmitters or deceptive positioning of the seatbelt as the unfastened status of the seatbelt buckle interlock 17 breaks a circuit and thus alerts the processing unit 14 regardless of any misleading interaction between the transmitters 10 and the antenna 12.

Furthermore, the processing unit 14 may be configured to periodically or continuously measure the electrical resistance of the antenna 12 in order to determine whether a decoy antenna routed in front of the steering wheel has been connected to the seatbelt antenna 12 in order to defeat the system. In this configuration, the resistance measurements of the antenna 12 are compared with prior measurements or a predetermined correct antenna resistance to verify that the antenna 12 has not been tampered with.

An alternative embodiment of the invention involves affixing the transmitter 10 to the seatbelt and the antenna 12 to the steering wheel. With this embodiment, monitoring of the steering wheel's motion may be accomplished by arranging the two devices such that the antenna 12 moves farther away from the transmitter 10 when the steering wheel is rotated, thus decreasing the strength of the signal received by the antenna 12. As discussed above, confirmation that the seatbelt is properly positioned can be accomplished by comparing a turn indication from the acceleration sensor 16 with the signal fluctuations received by the antenna 12. If the processing unit 14 has not measured signal fluctuations indicative of turning of the steering wheel rotation, then the system can provide a default or tamper signal.

Instead of the combination of one or more transmitters and an antenna, in another embodiment of the invention, the seatbelt detection system employs a scanning device and a target or mark that is arranged so that it can be read by the scanning device only when the seatbelt is correctly fastened around the operator. For instance, a bar-code or other code reader can be affixed to the dashboard or steering wheel to monitor an appropriate bar code or other machine readable code mark affixed to the seatbelt: The mark would be arranged on the seatbelt such that it is only within range of the scanning device when the seatbelt is correctly fastened around the operator.

A further alternative embodiment of the invention that might work in some situations involves employing a strain or tension sensor to measure force fluctuations imposed on the seatbelt retractor rollup shafts over time due to the shifting and jostling of the driver during operation. In order to determine whether the seatbelt is correctly fastened around the operator, the processing unit can be adapted to compare the monitor's measurements with predetermined values typically consistent with the vehicle's operation. Where the seatbelt is not fastened or fastened incorrectly, such as behind the operator, the sensor would detect less strain and/or no changes in strain on the retractor shaft.

Once the seatbelt detection system determines that the seatbelt is positioned incorrectly around the operator, the system could be configured to initiate one or more interlock mechanisms 18 to encourage the operator of the vehicle to fasten and use the seatbelt correctly. The invention can be configured with any number of specific mechanisms to accomplish this. For example, the processing unit 14 can be adapted to signal an interlock mechanism 18 which inhibits or prevents operation of the vehicle when the seatbelt is determined to be unfastened or fastened incorrectly. The interlock mechanism 18 may take the form of a speed governor 20 that prevents the engine from operating above idle in order to restrict the vehicle to a safe speed. Alternatively, an ignition lock or transmission lock 22 can be employed to prevent the vehicle from either being started or being moved until the seatbelt is fastened correctly.

To preclude potential safety issues, the interlock mechanism 18 could include an emergency override feature that could override the effects of any interlocks for a pre-determined time frame, long enough to remedy an emergency. In order to prevent continuous use of the override feature in such a manner that subverts the purpose of the invention, the override option can be configured to reset only upon shutting down and restarting the vehicle.

Another interlock mechanism 18 that could be used is a device which communicates a signal to a remote monitoring station 24 when the detection system determines that the seatbelt is not fastened properly. For example, an additional electromagnetic transmitter or transceiver can be actuated by the processing unit 14 when it is determined that the seatbelt is not properly fastened. The actuation of the transmitter or transceiver produces a wireless signal that can be received at the remote monitoring station 24. An individual at the remote monitoring location may then contact the operator or, if so configured, disable the vehicle by a remote override control. Alternatively or additionally, an interlock mechanism 18 consisting of a warning lamp 26 on the external surface of the vehicle that may be observed by non-occupants and/or a similarly functioning external warning buzzer can be incorporated into the seatbelt usage detection system of the present invention.

Additionally, an interlock mechanism 18 consisting of various internal warning devices can also be used. For example, an internal warning lamp 28 located on the dashboard or elsewhere could indicate that the seatbelt is not properly fastened. The location and brightness of the lamp can be varied across a range from providing a subtle warning to a warning causing proper fastening of the seatbelt due to the lamp's unpleasant effects. Alternatively, an internal warning buzzer could be employed in the same manner.

To further prevent tampering with the system, a real-time clock 30 can be incorporated into the processing unit 14 or interlock mechanism 18. The real-time clock 30 would record any abnormalities with the system such as a power loss in the system that could be indicative of tampering with the system. To ensure that the seatbelt usage detection system is operating properly, the processing unit 14 also can be adapted to perform periodic test routines. The testing routines may occur when the vehicle is first started and at subsequent times throughout vehicle operation. The testing routine indicators can be combined with the warning devices 20-28 mentioned above to indicate that the system may have been tampered with and that repair may be required.

Some Society of Automotive Engineer (SAE) standards that may be relevant to the present invention include (and which are incorporated herein by reference):

SAE J128 November 1994 "(R) Occupant Restraint System Evaluation—Passenger Cars and Light-Duty Trucks"

SAE J138 "Film Analysis Guides for Dynamic Studies of Test Subjects"

SAE J140 June 1995 "(R) Seat Belt Hardware Test Procedures"

SAE J141 June 1995 "(R) Seat Belt Hardware Performance Requirements"

SAE J339 June 1994 "(R) Seat Belt Hardware Webbing Abrasion Test Procedure"

SAE J383 June 1995 "(R) Motor Vehicle Seat Belt Anchorages-Design Recommendations"

SAE J384 June 1994 "(R) Motor Vehicle Seat Belt Anchorages—Test Procedure"

SAE J385 March 1995"Motor Vehicle Seat Belt Anchorages—Performance Requirements"

SAE J386 April 1980 "Seat Belts for Construction Machines"

SAE J782b Motor Vehicle Seating Manual

SAE J800 June 1994 "(R) Motor Vehicle Seat Belt Assembly Installation"

SAE J826 July 1995 "(R) Devices for Use in Defining and Measuring Vehicle Seating Accommodation"

SAE J833 January 1980 "USA Human Physical Dimensions"

SAE J879b Motor Vehicle Seating Systems

SAE J898 April 1980 "Control Locations for Construction and Industrial Equipment Design"

SAE J899 October 1980 "Operator's Seat Dimensions of Off-Road Self-Propelled Work Machines"

SAE J1368 October 1997 "Child Restraint Anchorages and Attachment Hardware"

SAE J1369 October 1997 "Anchorage Provisions for Installation of Child Restraint Tether Straps in Rear Seating Positions SAE J1460-1 October 1995 "(R) Human Mechanical Impact Response Characteristics-Dynamic Response of the Human Abdomen"

SAE J1516 March 1990 "Accommodation Tool Reference Point"

SAE J1517 March 1990 "Driver Selected Seat Position"

SAE J1522 March 1990 "Truck Driver Stomach Position"

SAE J1538 April 1995 "(R) Glossary of Automotive Inflatable Restraint Systems"

SAE J1630 March 1995 "Driver or Passenger Airbag Module Deployment Test Procedure"

SAE J1794 December 1996 "SAE Restraint Systems Effluent Test Procedure"

SAE J1819 November 1994 "(R) Securing Child Restraint Systems in Motor Vehicles"

SAE J1834 June 1991 "Seat Belt Comfort, Fit and Convenience"

SAE J2074 June 1993 "The Air Bag Systems in Your Car 'What the Public Needs to Know'"

SAE J2189 March 1993 "Guidelines for Evaluating Child Restraint System Interactions with Deploying Airbags"

SAE J2431 October 1997 "The Effects of Front-Mounted Accessories on Air Bag Sensors and Crashworthiness"

Additional relevant information can be found at the National Transportation Safety Board website www.ntsb.gov and the National Highway Traffic Safety Administration website www.nhtsa.dot.gov.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for detecting an operator wearing a seatbelt in a vehicle, the system comprising:
   first and second devices on the seatbelt and another part of the vehicle, respectively, that cooperate to establish a link when the two devices are brought into proximity of one another;
   a third device for providing an operating condition of the vehicle; and
   electronics responsive to the link and the operating condition for detecting inconsistencies between the link and the operating condition.

2. The system of claim 1 wherein the third device is a sensor for detecting when the vehicle is turning.

3. The system of claim 2 wherein the third device is an accelerometer.

4. The system of claim 1 further including a seatbelt buckle interlock that signals the electronics when a latch on the seatbelt is engaged with a seatbelt buckle.

5. The system of claim 1 wherein one of the first and second devices is a receiver and the other of the first and second devices is a transmitter.

6. The system of claim 1 wherein one of the first and second devices comprises a scanning device and the other of the first and second devices comprises a mark readable by the scanning device.

7. The system of claim 1 wherein the third device is a turn sensor.

8. The system of claim 4 wherein the electronics include an interlock mechanism responsive to detection by the seatbelt buckle interlock that the seatbelt is unbuckled.

9. The system of claim 8 wherein the interlock mechanism includes a speed governor limiting a speed of the vehicle.

10. The system of claim 8 wherein the interlock mechanism includes an ignition lock preventing the vehicle from starting.

11. The system of claim 8 wherein the interlock mechanism includes a transmitter for signaling a remote station.

12. The system of claim 8 wherein the interlock mechanism includes a warning lamp.

13. A method for detecting when an operator of a vehicle is wearing a seatbelt, the method comprising:
    monitoring a wireless link between the seatbelt and another part of the vehicle;
    monitoring an operating condition of the vehicle;
    detecting inconsistencies between the link and the operating condition; and
    providing a message that the seatbelt is not being worn properly.

14. The method of claim 13 wherein detecting inconsistencies includes detecting variations in the link inconsistent with the monitored operating condition.

15. The method of claim 13 wherein the wireless link is an electromagnetic link.

16. The method of claim 13 including preventing normal operation of the vehicle in response to the message.

17. The method of claims 13 including transmitting the message to a remote location.

18. The system of claim 1 wherein one or more characteristics of the link vary during normal operation of the vehicle and the operating condition provided by the third device also varies during normal operation of the vehicle such that inconsistencies in the variations of the one or more characteristics of the link and the operating condition are detected by the electronics as an indication the operator of the vehicle is not properly wearing the seatbelt.

19. A system for detecting an operator properly wearing a seatbelt in a vehicle, the system comprising:
    a wireless link between the seatbelt and another part of the vehicle that is established when the operator is properly wearing the seatbelt;
    a device for providing a signal when the seatbelt is fastened properly; and
    electronics responsive to the link and the signal for detecting inconsistencies among statuses of the link, the signal and an operating condition of the vehicle.

20. The system of claim 19 wherein the device is a seatbelt buckle interlock that signals when a latch on the seatbelt is engaged with a seatbelt buckle.

21. The system of claim 19 wherein the operating condition and one or more characteristics of the link vary during normal operation of the vehicle such that inconsistencies in the variations are detected by the electronics as an indication the operator of the vehicle is not properly wearing the seatbelt.

22. The system of claim 1 wherein the link is indicative of the seatbelt being properly worn by the operator.

23. The method of claim 13 wherein the operating condition of the vehicle varies in time under normal movement of the vehicle.

* * * * *